US012240383B2

(12) United States Patent
Hamming et al.

(10) Patent No.: US 12,240,383 B2
(45) Date of Patent: Mar. 4, 2025

(54) ADJUSTING INSTRUMENT

(71) Applicant: MCi (Mirror Controls International) Netherlands B.V., Woerden (NL)

(72) Inventors: Peter Alexander Hamming, Woerden (NL); Paulus Gerardus Maria Van Stiphout, Woerden (NL)

(73) Assignee: MCI (MIRROR CONTROLS INTERNATIONAL) NETHERLANDS B.V., Woerden (NL)

( * ) Notice: Subject to any disclaimer, the term of this patent is extended or adjusted under 35 U.S.C. 154(b) by 553 days.

(21) Appl. No.: 17/607,593

(22) PCT Filed: Apr. 29, 2020

(86) PCT No.: PCT/NL2020/050270
§ 371 (c)(1),
(2) Date: Oct. 29, 2021

(87) PCT Pub. No.: WO2020/222644
PCT Pub. Date: Nov. 5, 2020

(65) Prior Publication Data
US 2022/0219608 A1 Jul. 14, 2022

(30) Foreign Application Priority Data

Apr. 30, 2019 (NL) ........................ 2023038

(51) Int. Cl.
*B60R 1/074* (2006.01)
*B60R 1/076* (2006.01)
(52) U.S. Cl.
CPC .............. *B60R 1/074* (2013.01); *B60R 1/076* (2013.01)

(58) Field of Classification Search
CPC .. B60R 1/06; B60R 1/074; B60R 1/07; B60R 1/076
(Continued)

(56) References Cited

U.S. PATENT DOCUMENTS 6,022,113 A * 2/2000 Stolpe ..................... B60R 1/074
359/872
6,130,514 A * 10/2000 Oesterholt .............. B60R 1/074
359/872

(Continued)

FOREIGN PATENT DOCUMENTS

| CN | 103237684 A | 8/2013 |
|---|---|---|
| EP | 2639110 A1 | 9/2013 |
| JP | 2000503938 A | 4/2000 |

*Primary Examiner* — Christopher Garft
*Assistant Examiner* — Michael McDuffie
(74) *Attorney, Agent, or Firm* — Volpe Koenig

(57) ABSTRACT

Adjusting instrument for an exterior vision unit, comprising: a base shaft, a housing surrounding the base shaft, which is pivotable around a longitudinal axis of the base shaft in an adjustment range, wherein the housing is provided with a housing ring, and a drive ring surrounding the base shaft. The drive ring is provided with a cam which can cooperate with the housing ring so as, upon pivoting of the housing relative to the drive ring in a pivoting direction around the base shaft, to move the housing via the housing ring from a high housing position along the base shaft downwards into a low housing position, and upon pivoting of the drive ring relative to the housing in an opposite pivoting direction around the base shaft, to move the drive ring along the base shaft upwards from a low drive ring position into a high drive ring position.

11 Claims, 8 Drawing Sheets

(58) Field of Classification Search
USPC ............. 248/476, 475.1, 466, 477, 478, 479
See application file for complete search history.

(56) References Cited

U.S. PATENT DOCUMENTS

| | | | | |
|---|---|---|---|---|
| 6,390,630 B1* | 5/2002 | Ochs | ................ | B60R 1/074 248/478 |
| 7,008,067 B2* | 3/2006 | Hsu | ................ | B60R 1/074 359/877 |
| 7,104,660 B2* | 9/2006 | Sakata | ................ | B60R 1/074 359/872 |
| 7,374,299 B2* | 5/2008 | Brouwer | ................ | B60R 1/074 359/841 |
| 7,490,945 B2* | 2/2009 | Proctor | ................ | B60R 1/076 248/478 |
| 7,543,949 B2* | 6/2009 | van den Brink | ........ | B60R 1/074 248/479 |
| 8,129,642 B2* | 3/2012 | Brouwer | ................ | B60R 1/074 200/405 |
| 8,205,517 B2* | 6/2012 | Fukushima | ....... | B60R 25/02153 180/187 |
| 8,366,285 B2* | 2/2013 | Reedman | ................ | B60R 1/074 248/479 |
| 8,579,444 B2* | 11/2013 | Lettis | ................ | B60R 1/06 359/872 |
| 8,708,505 B2* | 4/2014 | Iseki | ................ | B60R 1/074 359/872 |
| 8,720,845 B2* | 5/2014 | Courbon | ................ | B60R 1/0612 359/872 |
| 9,987,987 B2* | 6/2018 | van Stiphout | ............ | B60R 1/06 |
| 10,562,453 B2* | 2/2020 | van Stiphout | .......... | B60R 1/074 |
| 10,940,801 B1* | 3/2021 | Harris | ................ | F16D 11/14 |
| 11,247,612 B2* | 2/2022 | Maat | ................ | B60R 1/076 |
| 11,661,017 B2* | 5/2023 | Bai | ................ | F16M 13/022 248/479 |
| 2010/0060024 A1 | 3/2010 | Flynn et al. | | |
| 2021/0046874 A1* | 2/2021 | Harris | ................ | B60R 1/074 |

* cited by examiner

Normal locked in drive

Electric drive unlock

Electric drive lifting multicams

Normal park

Electric return to drive engaging multicams via housing ring {draw in}

Electric back in drive towards drive lock

Normal locked in drive

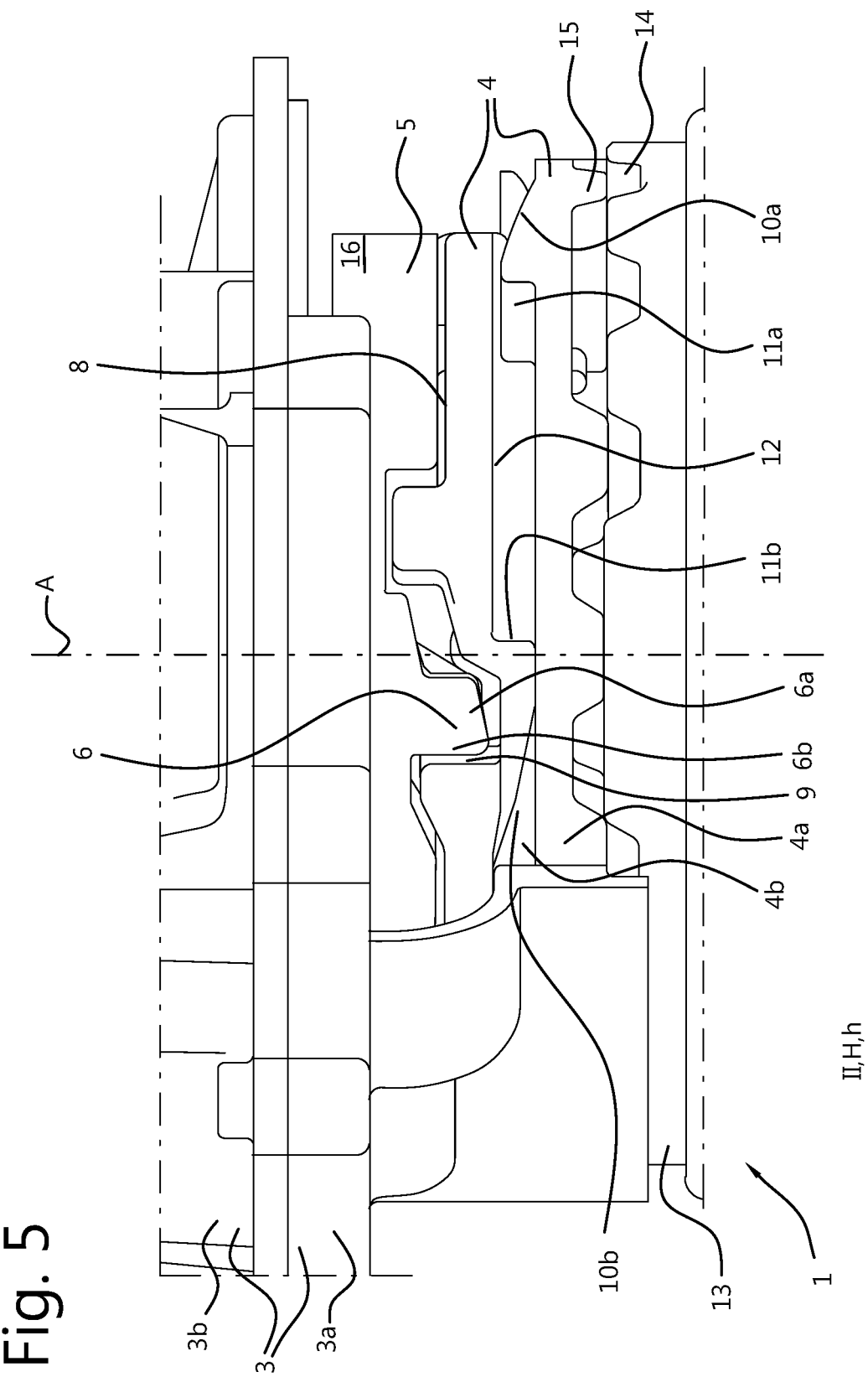

Apply external force at park, gear high

Manual disengagement of drive ring

Electric drive housing to drive to engage multicams at drive

Multicams engaged, continue top section housing ring; gear low

Housing rings cooperate to set gear back to high

Gear back high

Electric back to park to reset

ADJUSTING INSTRUMENT

CROSS REFERENCE TO RELATED APPLICATIONS

This application is a 35 USC § 371 National Stage application of International Patent Application No. PCT/NL2020/050270, which was filed Apr. 29, 2020, entitled "ADJUSTING INSTRUMENT" which claims priority to Netherlands Patent Application No. 2023038, filed Apr. 30, 2019 and is incorporated herein by reference as if fully set forth.

The invention relates to an adjusting instrument for an exterior vision unit for a vehicle.

Adjusting instruments for an exterior vision unit, such as an exterior mirror, exterior display and/or exterior camera, are used on vehicles, for example, automobiles. Such an adjusting instrument is generally known for the purpose of an exterior mirror unit and usually comprises a housing which is pivotable relative to a base to be coupled with the vehicle in an adjustment range, for instance between two positions, typically between a drive position and a park position. Pivoting still further from the drive position to an overfold position is also possible. In the park position, the exterior vision unit extends substantially along the vehicle, in the case of an exterior mirror unit with a mirror side facing the vehicle. In the drive position, the exterior vision unit is usually directed substantially transversely to the vehicle, and in the case of an exterior mirror unit with the mirror side facing rearwards relative to the normal driving direction. Within this context, other positions are also possible, for example a work position or drive position in which the exterior vision unit includes a different angle with respect to the vehicle, for example an angle of about 60 or about 30 degrees. In the overfold position, the vision unit extends substantially along the vehicle, in the case of an exterior mirror unit with the mirror side facing away from the vehicle. With other exterior vision units, whether or not in combination with an exterior mirror, the positions mentioned can be assumed by an exterior display and/or camera lens. An exterior display and/or camera lens may then for instance be arranged on the exterior vision unit roughly in the same position as an exterior mirror, but may also be arranged on the exterior vision unit in other positions.

Adjusting of the exterior vision unit may be done electrically, for instance during normal use from the park position to the drive position and vice versa. The adjusting instrument is then provided with an electric drive with which the housing can be pivoted around the base. The electric drive is usually of self-locking construction.

The exterior vision unit may also be adjusted under the influence of an external force, for example in case of an impact such as a collision, or in manual operation. Thus, the exterior vision unit may be moved, for instance by collision with an object, from the drive position to the overfold position, or to the park position. Also, the exterior vision unit can for instance be moved manually from the park position to the drive position, and vice versa. The electric drive is then often provided with a break coupling, so that the electric drive upon being operated under the influence of an external force exceeding a defined threshold value, can be decoupled. Thus, damage of the drive can be prevented, which is especially important when the drive is of self-locking construction. After operation under the influence of an external force, the electric drive can be re-coupled again via the coupling in an electrically driven reset movement, for instance by carrying out an electrically driven reset movement towards the park position.

To counteract vibrations during use, it is important for the drive position to be well defined. In practice, for this purpose, often a strong spring is used, which presses the housing onto the base continuously.

With electric adjustment, however, such a strong pressing down of the housing on the base is less desirable, because it necessitates a relatively powerful driving motor in carrying out the adjusting movement. Because of such spring force, furthermore, upon adjustment under the influence of an external force, the drive may be subject to relatively large forces before uncoupling takes place. As a consequence, in practice, the components in the drive train of the drive must often be made more force-resistant than is necessary for driving. From the viewpoint of costs, however, it is desirable to make the drive of lighter construction.

From WO2012047104, in particular the embodiment of FIG. 10, it is known, upon manual operation from the drive position, to transfer the uncoupling force via cooperating cam rings, and, during electric adjustment, to leave the housing free of spring force, so that the electric drive is relieved. This adjustment device provides many advantages in that the electric drive can be made of light construction, and works well in practice.

It is disadvantageous, however, that with electric adjustment from the park position back to the drive position, the cam rings do not always interlock properly.

In WO 2017074193 it has therefore been proposed to arrange for the force transmission cams, in the drive position, to be supported on the housing cam track, allowing them in and near the drive position to cooperate directly with the housing, and thereby cause the cam rings to interlock better. The housing cam track is then provided with oblique flanks near a position corresponding to the drive position. When the housing pivots from the park position to the drive position, the force transmission cams, by the movement along these oblique flanks of the housing cam track, press the housing cam ring and the base cam ring into each other. Such direct control of the interlocking of the cam rings is especially advantageous because the housing is not under spring action during electric operation.

Such an adjusting instrument for an exterior vision unit for a vehicle according to WO 2017074193 comprises:

a base, comprising a foot and base shaft extending therefrom along a longitudinal axis, a housing surrounding the base shaft, which is placed on the foot and which is pivotable in an adjustment range around the longitudinal axis of the base shaft, between a park position and an overfold position, via an intermediate drive position, which housing is provided with a housing ring, and a drive ring surrounding the base shaft, and which is provided with three force transmission cams spaced apart along the circumference with equal interspaces, which force transmission cams cooperate with the housing ring of the housing.

The force transmission cams in the adjusting instrument according to WO 2017074193 cooperate with the housing ring so as, upon rotation of the drive ring relative to the housing in a first direction around the base shaft near the drive position of the housing, to move the housing from a high housing position along the base shaft downwards into a low housing position in which the housing is locked against rotation.

The force transmission cams in the adjusting instrument according to WO 2017074193 also cooperate with the housing ring so as, upon rotation of the drive ring, to move the drive ring along the base shaft, during an electrically driven reset movement, upwards from a low drive ring position into a high drive ring position, so that the drive ring, after it has been pivoted through action of an external force, together with the housing, relative to the base shaft, can be returned again to its initial position in the drive position by the electric drive.

In particular, during this electric reset movement, the force transmission cams can be transferred from the housing ring near the drive position in an axially high drive ring position onto the cam ring, so that they can thereupon, in the same axially high drive ring position, upon electrically driven adjustment of the drive ring relative to the housing near the drive position be placed on the housing ring again to put the cam rings of the housing and the base, interlocking in the drive position, under spring action.

While the known device offers many advantages, it also has a disadvantage. The drive ring, for the sake of the supporting stability, is provided with three cams spaced apart with mutually equal interspaces. These cams cooperate with three housing track cams spaced apart on the housing ring with mutually equal interspaces. Those housing track cams are located near the drive position, and have, in circumferential direction, on one side a run-on surface which can cooperate with the force transmission cam to move the drive ring during the reset movement axially upwards into the high drive ring position, and on the other side a second run-on surface which can cooperate with the force transmission cam to press the housing axially downwards. Thus, on the housing ring three track segments are present which are each between two housing track cams and each have a first run-on surface at one end and a second run-on surface at an opposite end.

Especially the first run-on surface takes up a considerable part of the available circumferential space, because the drive ring has to be able to move up the run-on surface, against the action of a spring, with a cost efficiency-wise preferably relatively weak electric motor, and without a motor current limiter for cutting the electric motor coming into operation. Consequently, with a normal, electrically driven adjusting movement, the maximum angle through which the housing of the adjusting instrument can be adjusted relative to the base is relatively small. When from the drive position the housing is being moved electrically to the park position, the first run-on surfaces limit for the reset a stroke which the housing can make when it moves to park, in that the force transmission cams run against the second run-on surfaces.

Due to the presence of the cams and their run-on surfaces, of the 120 degrees theoretically available for adjustment, only a more limited adjustment angle of about 70 degrees is left. In a number of cases, however, an adjustment angle of more than 70 degrees is desired. For instance, in a number of cases it is desirable to place the housing from a work position in which it is virtually perpendicular to the vehicle, to a park position in which the housing is situated practically parallel along the vehicle. In other embodiments, in which for example two or only one force transmission cam is used, likewise the theoretically available adjustment angle of 180 degrees or 360 degrees is not completely available due to the presence of the cam(s) and the run-on surfaces thereof.

The invention contemplates an adjusting instrument with which, while preserving the advantages mentioned, the disadvantage mentioned can be counteracted. To this end, the invention provides an adjusting instrument for an exterior vision unit for a vehicle comprising:

a base shaft extending along a longitudinal axis, a housing surrounding the base shaft, and which is pivotable around the longitudinal axis of the base shaft in an adjustment range, and which is provided with a housing ring, and a drive ring surrounding the base shaft, and which is provided with a force transmission cam which can cooperate with the housing ring so as, upon rotation of the housing relative to the drive ring in a first direction around the base shaft, to move the housing via the housing ring from a high housing position along the base shaft downwards into a low housing position, and upon rotation of the drive ring relative to the housing in an opposite direction around the base shaft, to move the drive ring along the base shaft upwards from a low drive ring position into a high drive ring position, wherein the housing ring comprises a first bottom section which is rotation-coupled with the housing, and comprises a second top section which by an underside thereof is supported on the first section and which by an upper side thereof can cooperate with the force transmission cam, wherein the top section of the housing ring is rotatable around the base shaft relative to the bottom section, wherein the bottom section and the top section are each provided with first run-on surfaces, which pairwise cooperate to move the drive ring via the force transmission cams axially upwards into the high drive ring position, and wherein the top section is provided with a second run-on surface which cooperates with the force transmission cam to press the housing axially downwards.

By thus providing a housing ring with an articulate, rotatable top section, it is made possible that by the use of intermediate run-on surfaces, space on the upper surface of the ring can be cleared, and the run-on surface remaining on the upper surface can still be rotated out of the way.

By providing the top section and the bottom section each with a stop surface, which stop surfaces through pairwise cooperation limit rotation of the top section relative to the bottom section in one rotation direction, it can be achieved that in one rotation direction the free rotation of the top section of the housing ring is limited and the second run-on surface becomes operative at a predetermined place, for example near the work position.

Elegantly, the first run-on surfaces cooperate near a work position when the drive ring moves in a first rotation direction relative to the housing, and the second run-on surfaces cooperate near the work position when the drive ring moves in a second, opposite rotation direction relative to the housing.

When upon rotation of the drive ring the top section of the housing ring is, relative to the bottom section of the housing ring, carried along in rotation by the force transmission cam of the drive ring, it can be achieved that the point at which the run-on surfaces cooperate can be shifted, as a result of which the free space for adjustment and hence the adjustment angle is enlarged.

Advantageously, the housing, with the top section of the housing ring being carried along by the force transmission cam of the drive ring, can traverse, from a first position into a second position, an angle of more than 360 degrees divided by the number of cams of the drive ring that can cooperate with the housing ring, minus at least the angle spanned by the first run-on surface upper side. Given three cams spaced apart with, for example, equal interspaces, the angle which can be traversed is, for example, more than 70 degrees, in particular more than 75 degrees, preferably about 80 degrees, and more preferably about 90 or about 100 degrees.

When the first run-on surfaces at the upper side of the top section of the housing ring and the second run-on surfaces at the underside of the top section of the housing ring overlap each other in circumferential direction in each case, it can be achieved that the free space for adjustment and hence the adjustment angle is enlarged. The first and second run-on surfaces may be located axially at different positions, but may also be located radially at different distances from the longitudinal axis.

Advantageously, the housing and a foot provided on the base shaft are each provided with a housing cam ring and a base cam ring, respectively, which in the adjustment range interlock only in the drive position, namely so that the housing is in the low housing position, and which upon pivoting of the housing relative to the base from the drive position along the longitudinal axis move apart axially, and upon further pivoting are at least partly supported on each other, namely so that the housing is in the high housing position.

Also, the adjusting instrument preferably comprises a spring which surrounds the base shaft and which exerts a spring force on the drive ring along the longitudinal axis in the direction of the foot.

Further, the adjusting instrument advantageously comprises an electric drive unit which is included in the housing, provided with an output element for electrically adjusting the instrument, the output element cooperating with the circumference of the drive ring.

Also, the adjusting instrument advantageously comprises a base cam track provided on the base shaft.

As regards the disclosure in this application, it is noted that the technical features of the adjusting instrument described in the main claim can also be seen as an invention each independently or in combination with only one or more technical features from the main claim, the dependent claims or the description.

The invention also relates to an exterior vision unit for a motor vehicle, comprising an adjusting instrument, and a mirror, display and/or camera coupled with the housing.

The invention will be further elucidated on the basis of an exemplary embodiment of an adjusting instrument which is shown in drawings. In the drawings:

FIG. 5 shows a schematic cross section of the adjusting instrument of FIG. 1 in assembled condition in the park position;

It is noted that the figures are only shown by way of exemplary embodiment and should not be considered as limiting in any way.

Figure 1:
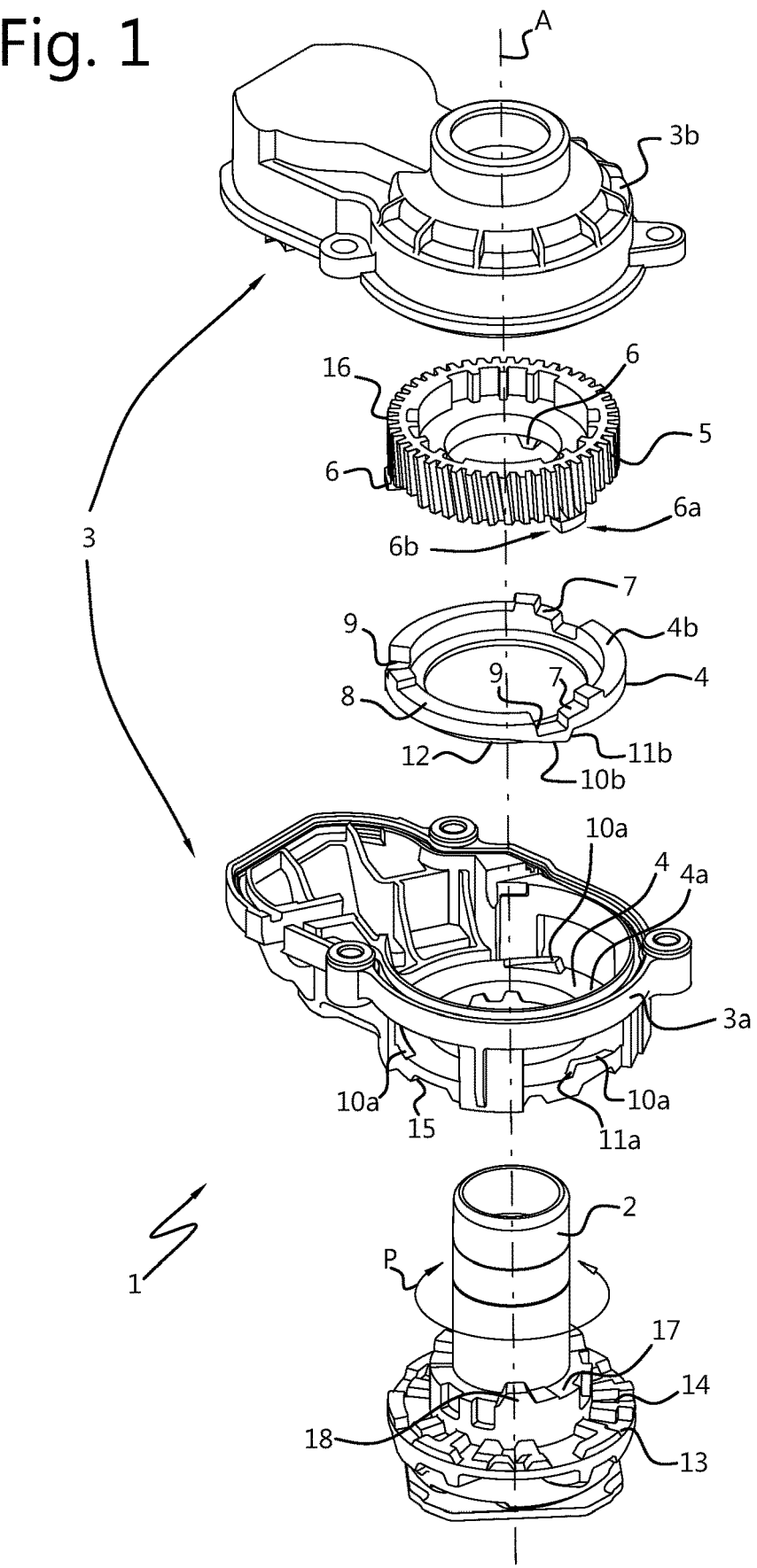
FIG. 1 shows a schematic perspective exploded view of an adjusting instrument according to the invention, seen from above.
Figure 2:
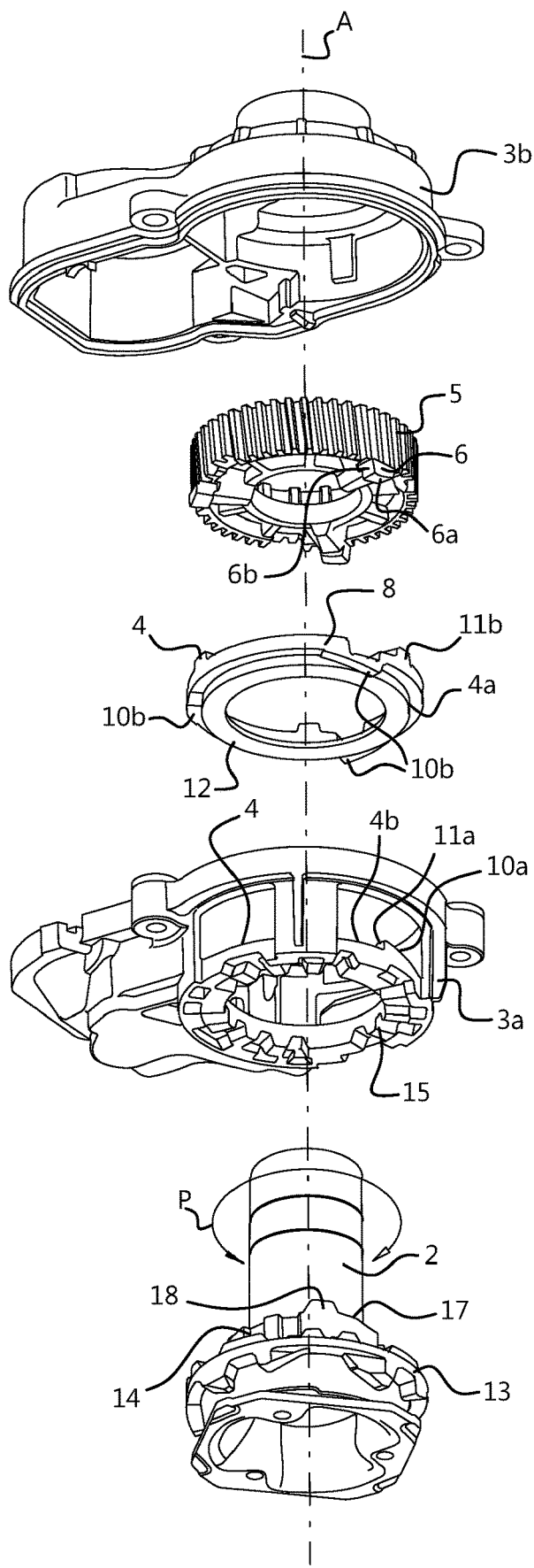
FIG. 2 shows a schematic perspective exploded view of the adjusting instrument of FIG. 1, seen from below.

FIGS. 1 and 2 show an adjusting instrument 1 for an exterior vision unit of a vehicle. The adjusting instrument 1 comprises a base shaft 2 which extends along a longitudinal axis A. The adjusting instrument 1 furthermore comprises a housing 3 which surrounds the base shaft 2. The housing 3 is made up of a bottom member 3a and a top member 3b. The housing 3 is pivotable around the longitudinal axis A of the base shaft 2 in an adjustment range, in particular from the work position I shown in FIGS. 1 and 2 into a park position II and back. The adjusting instrument 1 furthermore comprises a housing ring 4, and a drive ring 5 which surrounds the base shaft 2.

The housing ring 4 is of articulate construction, and comprises a bottom section 4a and a top section 4b. The bottom section 4a is rotation-coupled with the housing 3, and in this embodiment is integrated with the bottom member 3a of the housing. The top section 4b is rotatable relative to the bottom section 4a and relative to the housing 3 around the longitudinal axis A.

The drive ring 5 is provided with three force transmission cams 6 spaced apart with equal mutual interspaces, which can cooperate with the housing ring 4 upon rotation of the drive ring 5 relative to the housing 3. Upon rotation of the housing 3 in a first direction around the base shaft 2 relative to the drive ring 5, represented with the closed head of arrow P, the force transmission cams 6 can cooperate by first flanks 6a with second run-on surfaces 7 on the upper side 8 of the top section 4b of the housing ring 4 to move the housing 3 via the housing ring 4 from a high housing position H along the base shaft 2 downwards into a low housing position L. The top section 4b is thus provided with a second run-on surface 7 which cooperates with the force transmission cam 6 to press the housing 3 axially along the longitudinal axis A downwards when, for example, upon normal, electrically driven adjustment, from the park position II the drive position I is being approached, as, for example, stepwise represented in FIGS. 4d-g.

Upon rotation of the drive ring 5 relative to the housing 3 in an opposite direction around the base shaft 2, i.e., in the direction of the open head of arrow P, the drive ring 5, through cooperation with the housing ring 4, can move upwards along the base shaft from a low drive ring position 1 into a high drive ring position h. In this embodiment, that has been realized in that second flanks 6b of the force transmission cams 6 engage catch surfaces 9 on the upper side 8 of the top section 4b of the housing ring, as a result of which the drive ring 5 carries the top section 4b of the housing ring 4 along in rotation (FIG. 4c). The bottom section 4a and the top section 4b are each provided with three pairs of first run-on surfaces 10a, 10b, spaced apart with mutual interspaces. The first run-on surfaces 10a, 10b cooperate pairwise to move the drive ring 5 via the force transmission cams 6 supported on the upper side 8 of the housing ring 4, axially along the longitudinal axis A upwards from the low drive ring position 1 into the high drive ring position h. Thus, for example, during an electrically driven reset movement, the drive ring 5 can move upwards along the longitudinal axis A from the low drive ring position 1 into the high drive ring position h.

The bottom section 4a and the top section 4b of the housing ring 4 are each provided with three sets of stop surfaces 11a, 11b spaced apart with equal interspaces and which in this embodiment are configured to be substantially standing along the longitudinal axis A. The stop surfaces 11, through pairwise cooperation, limit rotation of the top section 4b relative to the bottom section 4a in one direction of rotation, in this case rotation in the direction of the open head of arrow P. In this embodiment, the stop surfaces 11 are operative near the work position I.

The second run-on surfaces 7 at the upper side 8 of the top section 4b of the housing ring 4 and the first run-on surfaces 10b at the underside 12 of the top section 4b of the housing ring 4 are located at different positions along the longitudinal axis A of the base shaft 2. The housing 3 can thus, from the park position II up to the drive position I, traverse an angle of more than 70°, in particular about 80°.

The bottom member 3a of the housing 3 and a foot 13 provided on the base shaft 2 are each provided with a housing cam ring 15 and a base cam ring 14, respectively, which in the adjustment range interlock only in the drive position, namely so that the housing 3 is in the low housing position L. Upon pivoting of the housing 3 relative to the base shaft 2 from the drive position I in the direction of the park position II, i.e., in the direction of the open arrow P, the cam rings 14, 15 move apart axially along the longitudinal axis A. Upon further pivoting they are at least partly supported on each other, namely so that the housing 3 is in the high housing position H.

The drive ring 5 and hence the force transmission cams 6, in this example, are under action of a spring. The spring is not represented to sustain easy reference and is implemented as a helical spring which surrounds the base shaft 2 and which exerts a spring force on the drive ring 5 along the longitudinal axis A.

The adjusting instrument 1 of this exemplary embodiment furthermore comprises an electric drive unit, also not shown, which is included in the housing 3, provided with an output element, for example a worm wheel, for electrically adjusting the instrument 1, the output element cooperating with the circumference 16 of the drive ring 5, for example via a toothing. For use as an exterior vision unit for a motor vehicle, the adjusting instrument 1 comprises a mirror, display and/or camera coupled with the housing 3.

The adjusting instrument 1 is furthermore implemented with a base cam track 17 provided on the base shaft 2. The base cam track 17 is configured for it, during normal electrically driven adjustment between the drive position I and the park position II, to serve as support for the first flanks 6a of the force transmission cams 6, so that the spring force is absorbed by the base shaft 2. The housing 3 is then free of spring force, so that the cam rings 14, 15 on, respectively, the foot 13 of the base shaft 2 and the underside of the bottom member 3a of the housing 3, can move apart easily and housing 3 can easily rotate over foot 13 when they are supported on each other. When the angle corresponding to the drive position I has been reached, the drive ring 5 makes a stroke whereby the force transmission cams 6 go over from the base cam track 17 to the upper side 8 of the top section 4b of the housing ring 4. Thus, the spring force is transmitted via the housing 3, as a result of which the cam rings 14, 15 on, respectively, the base shaft 2 and the housing 3 in the drive position I are energized by the spring. When during electric adjustment from the park position II the work position/drive position I is reached, the interlocking of the cam rings 14, 15 is controlled by cooperation of the first flanks 6a of the force transmission cams 6 and the corresponding second run-on surfaces 7 on the upper side 8 of the top section 4b of the housing ring 4; the housing 3 then goes over from the axially high housing position H to the axially low housing position L.

Figure 3:
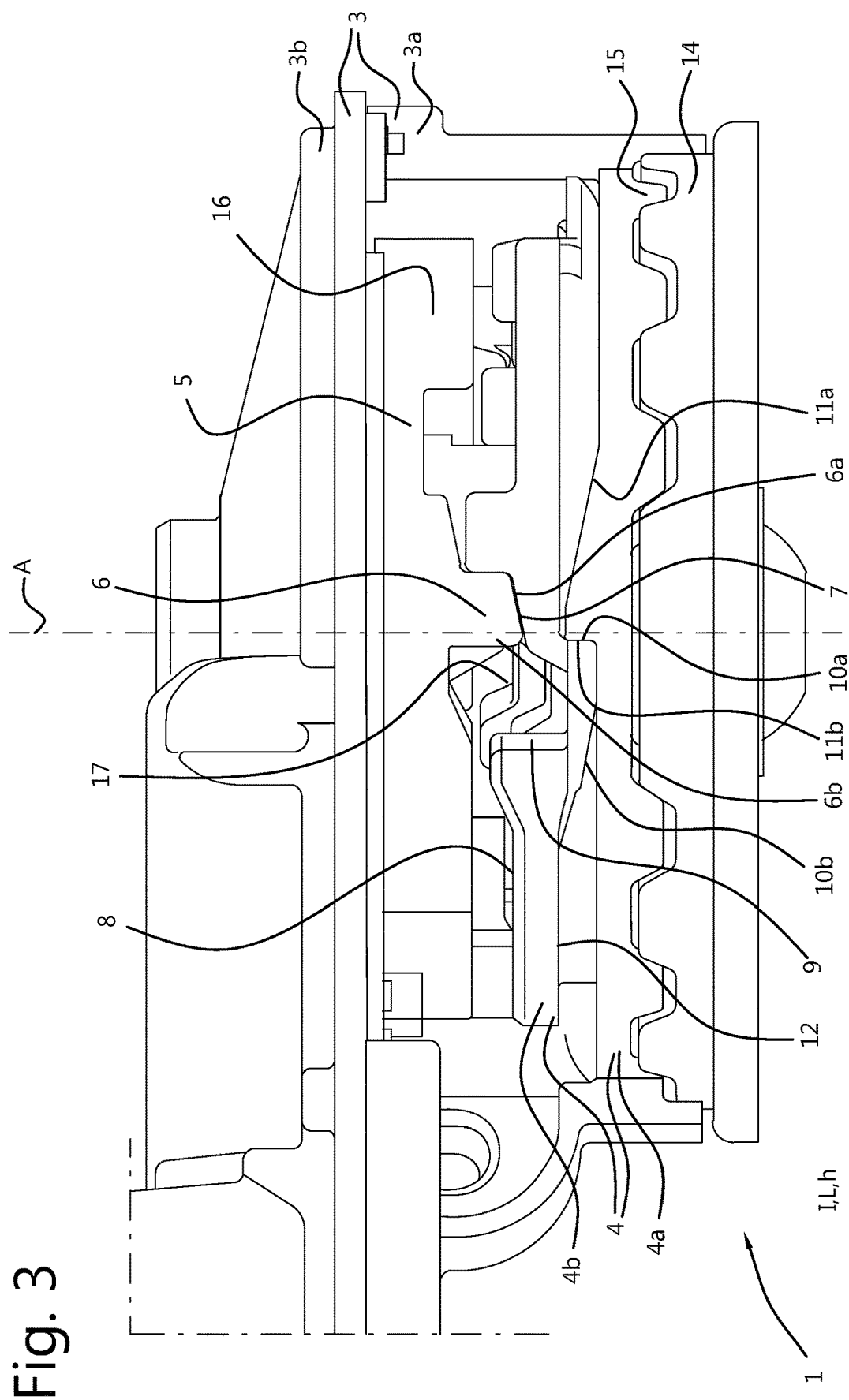
FIG. 3 shows a schematic cross section of the adjusting instrument of FIG. 1 in assembled condition in the drive position.
Figure 4A:
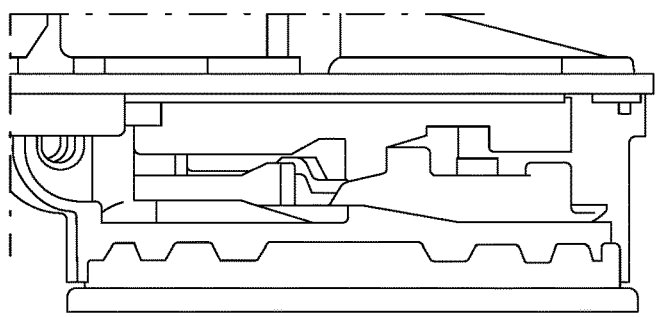
FIGS. 4a through 4g show a schematic side view of the adjusting instrument of FIG. 3 during electric adjustment from the drive position shown in FIG. 3 to the park position and back.
Figure 4B:
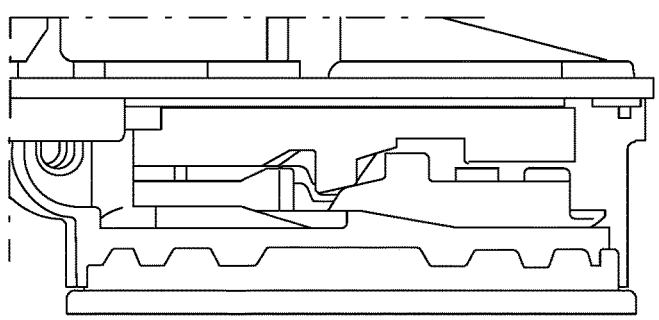
Figure 4C:
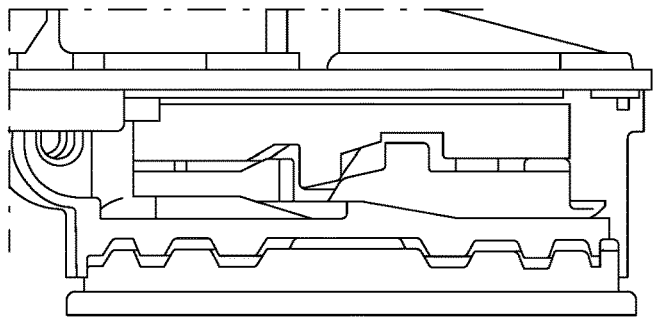

Illustrated in FIGS. 4a through 4g, in a schematic side view of the adjusting instrument 1, is the operation during electric adjustment from the drive position I to the park position II and back. FIG. 4a shows, on a reduced scale, just like FIG. 3 the adjusting instrument 1 in the work position I with the housing 3 in the low housing position L. The force transmission cams 6 of the drive ring 5 are supported by their first flanks 6a on the second run-on surfaces 7 on the upper side 8 of the top section 4b of the housing ring 4. The housing cam ring 15 and the base cam ring 14 interlock, and are under action of the spring, not represented.

FIG. 4b shows that drive ring 5, due to the output element of the electric drive engaging the circumference 16, has made an angular stroke relative to the housing 3, as a result of which the first flanks 6a of the force transmission cams 6 have gone over onto the base cam track 17. The spring force is now transmitted via the base shaft 2, and the housing 3 is free of spring action.

FIG. 4c shows that upon further electric adjustment, the housing 3 can now rotate relative to the drive ring 5. The housing cam ring 15 moves upwards out of the base cam ring 14, and the housing 3 moves from the axially low housing position L to an axially high housing position H. At the same time, the housing 3 rotates from the drive position I around the base shaft 2 in the direction of the park position II. The top section 4b of the housing ring 4 cooperates via the second flanks 6b of the force transmission cams 6 with catch surfaces 9 on the upper side 8 of the top section 4b of the housing ring 4. The top section 4b of the housing ring 4 is now retained by the drive ring 5, so that it stands still relative to the base shaft 2. The bottom section 4a of the housing ring 4 rotates along with the housing 3, and rotates around the base shaft 2.

Figure 4D:
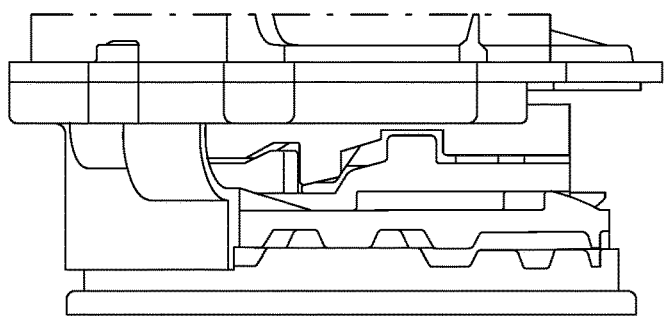

FIG. 4d shows that upon further electric adjustment, the housing 3 remains in the axially high housing position H due to the housing cam ring 15 being supported on the base cam ring 14. The housing 3 and the bottom section 4a of the housing ring 4 continue to rotate until the park position II shown in FIG. 4d has been reached. In the park position II, the housing 3 runs against a stop, not represented, and the electric drive stops. The second run-on surfaces 7 on the upper side 8 of the top section 4b of the housing ring 4 and the first run-on surfaces 10b on the underside 12 of the top section 4b of the housing ring 4 do not sit in each other's way, for they are located at different height positions along the longitudinal axis A of the base shaft 2. The housing 3 can thus, between the drive position I and the park position II, traverse an angle of more than 70°, being about 80° in this exemplary embodiment.

Figure 4E:
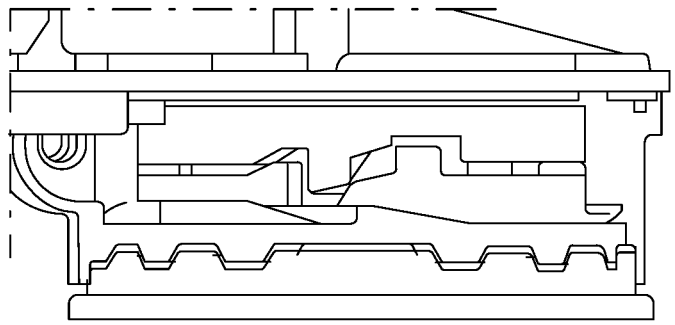

FIG. 4e shows that upon electric adjustment of the housing 3 back to the drive position I, the second run-on surfaces 7 at the upper side 8 of the top section 4b of the housing ring 4 cooperate with the first flanks 6a of the force transmission cams 6 to force the cam rings 14, 15, not being under spring action yet, into engagement. The housing 3 begins to move downwards along the longitudinal axis A from the axially high housing position H to the axially low housing position L.

Figure 4F:
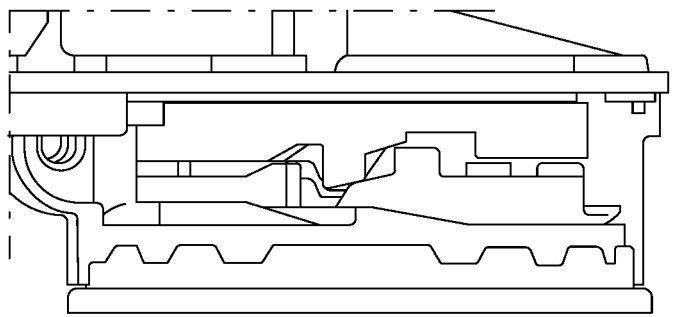
Figure 4G:
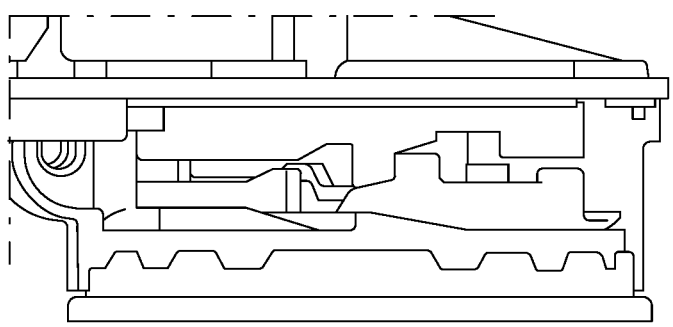

FIG. 4f shows that the cam rings 14, 15 are in engagement again, and that the housing 3 is in the axially low housing position L. The position corresponding to the drive position I has been reached, and the housing 3 is now rotation-coupled with the base shaft 2. In consequence, the housing 3 continues to stand still with respect to the base shaft 2, and the drive ring 5 rotates making an angular stroke with respect to the housing 3 and the base shaft 2. As a result, the first flanks 6a of the force transmission cams 6 go over from the base cam track 17 onto the second run-on surfaces 7 on the upper side 8 of the top section 4b of the housing ring 4. The stop surface 11a on the bottom section 4a of the housing 3 cooperates with the stop surface 11b of the top section 4b of the housing ring 4, and limits rotation of the top section 4b of the housing ring 4 relative to the bottom section 4a of the housing ring 4. Further rotation of the drive ring 5 is not possible, and the electric drive stops. The housing 3 has now come to be under spring action again, and the adjusting instrument is locked in the drive position I.

With the aid of the housing ring 4, and in particular via the first run-on surfaces 10a, 10b, the drive ring 5, after it, together with the housing 3, has been adjusted angularly around the base shaft 2 under the influence of an external force, can, with the aid of the electric drive, in a reset movement, be brought into the proper position with respect to the base shaft 2 again. This is elucidated below on the basis of FIG. 5 and FIGS. 6a-g. FIG. 5 shows the adjusting instrument 1 in the park position II with the housing 3 in the high housing position H. The force transmission cams 6 of the drive ring 5 are supported by their first flanks 6a on the base cam track 17, and transmit the spring force via the base shaft 2. The drive ring is in the axially high drive ring position h. The housing cam ring 15 is supported on the base cam ring 14, but the housing 3 is not under spring action. FIGS. 6a through 6g show in a schematic side view of the adjusting instrument 1 the operation during manual adjustment from the park position II in the direction of the drive position I, and subsequent electric resetting.

Figure 6A:
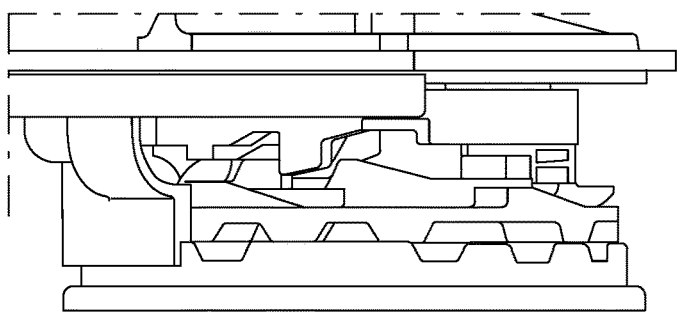
FIGS. 6a through 6g show a schematic side view of the adjusting instrument of FIG. 5 during manual adjustment and subsequent electric resetting from the park position shown in FIG. 5.

FIG. 6a shows on a reduced scale, just like FIG. 5 the adjusting instrument 1 in the park position II, where an external force is exerted manually or otherwise. For ease of reference, a part of the top section 4b of the housing ring 4 above the first run-on surface 10b on the underside of the top section 4b of the housing ring 4 is drawn transparent.

Figure 6B:
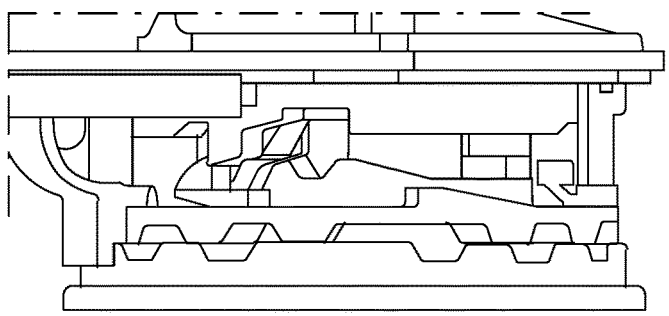

In FIG. 6b it can be seen that the drive ring 5 has gone up, against the action of the spring not shown, and that the force transmission cams 6 have been moved by their second flanks 6b beyond the stops 18 on the base cam track 17.

Figure 6C:
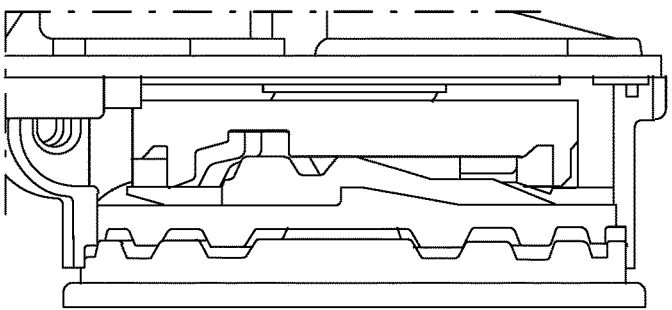
Figure 6D:
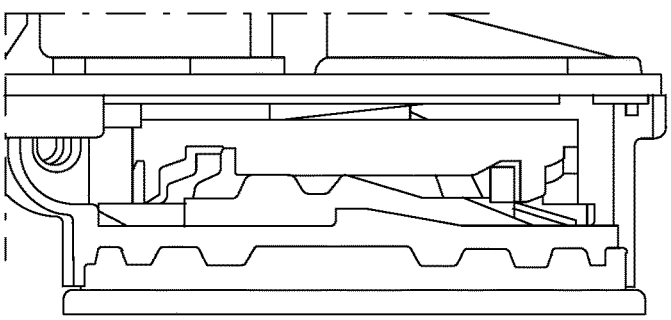
Figure 6E:
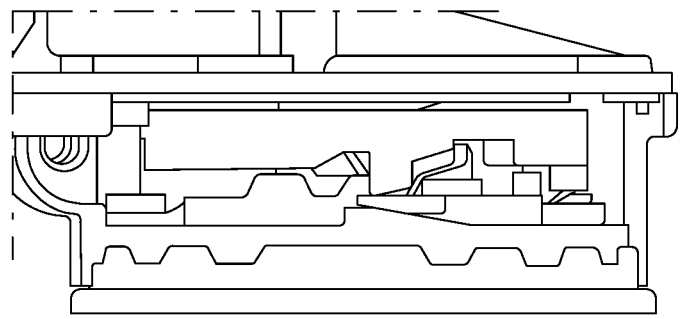
Figure 6F:
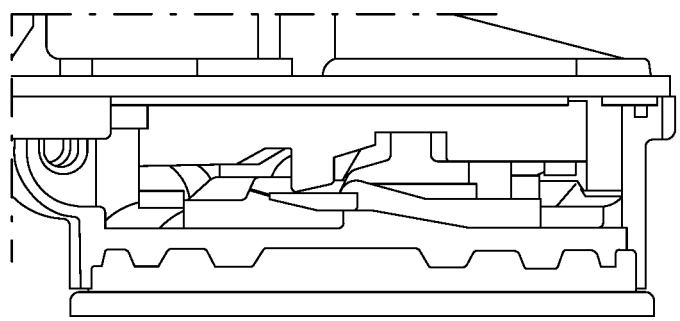
Figure 6G:
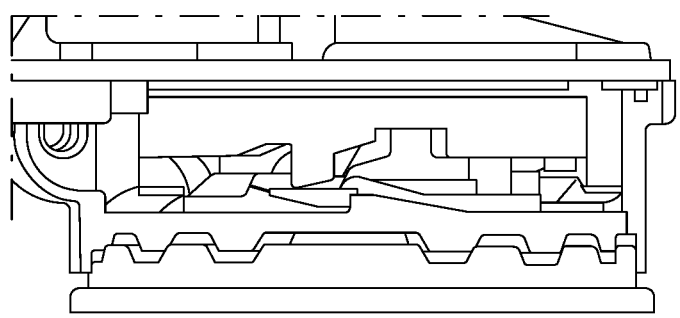

In FIG. 6c it can be seen that the force transmission cams 6 of the drive ring 5 thereupon carry along by their first flanks 6a the top section 4b of the housing ring 4. The drive ring 5 is in the axially high drive ring position h. Thereupon, in an electric reset movement, via the top section 4b of the housing ring 4, the bottom section 4a of the housing ring 4 and hence the housing 3 is carried along to the angular position corresponding to the drive position I. When the housing 3 is in the drive position I, the housing cam ring 15 and the base cam ring 14 interlock, and the housing 3 moves from the high housing position H to the low housing position L. The drive ring 5, which is supported via the housing ring 4 on the housing 3, thereby comes down from the axially high drive ring position h to an axially low drive ring position 1. The housing 3 and, rotation-coupled therewith, the bottom section 4a of the housing ring 4 remain standing still, but the top section 4b of the housing ring 4 is carried along by the force transmission cams 6, and rotates along with the drive ring 5 driven by the electric drive. This is represented in FIG. 6d. This continues until the first run-on surfaces 10a, 10b on, respectively, the upper side of the bottom section 4a of the housing ring 4 and the underside 12 of the top section 4b of the housing ring 4 cooperate. This is represented in FIG. 6f. The run-on surfaces 10a, 10b have a gentle slope, which can be run up with the electric drive. Due to the relative rotation of the housing ring sections 4a, 4b, the top section 4b of the housing ring 4 moves up along the longitudinal axis A, against the action of the spring. The drive ring 5, which via the force transmission cams 6 is supported on the top section 4b of the housing ring 4, consequently moves axially upwards along the longitudinal axis A from the low drive ring position I back to the high drive ring position h. In this high drive ring position h, the force transmission cams 6 can go over onto the base cam track 17. As a result, the first flanks 6a of the force transmission cams 6 go over from the base cam track 17 onto the second run-on surfaces 7 on the upper side 8 of the top section 4b of the housing ring 4. The drive gear rotates further until the first flanks 6a of the force transmission cams abut against stops 18. The spring now acts via the force transmission cams 6 and the base cam track 17 on the base shaft 2, and not on the housing 3 or housing ring 4. Electrically driven rotation of the drive ring 5 and, being rotation-coupled therewith via the force transmission cams 6, the top section 4b of the housing ring, is not possible, and the bottom section 4a of the housing ring 4 and the housing 3 now begin to rotate together in the direction of the park position II. The housing 3, through cooperation of the housing cam ring 15 with the base cam ring 14, moves axially upwards along the longitudinal axis A to the high housing position H, and the housing 3 rotates together with the bottom section 4a of the housing ring 4 back into the park position II. The adjusting instrument 1 is then ready again for normal electrically driven adjustment from the park position II to the drive position I as set out hereinbefore on the basis of FIGS. 4a-g. The invention is not limited to the exemplary embodiment represented here. Many variants are possible. Thus, the bottom section of the housing ring may be implemented as a separate part which is supported on the housing, and which is rotation-locked therewith. Also, for example, a different number of force transmission cams may be used, for example only one or two. Also, the housing may be adjustable via the adjusting instrument between other positions than specifically a drive position and a park position, for example, between two work positions, or a number of work positions and a rest position. Such variants will be clear to one skilled in the art, and are understood to be within the scope of the invention as defined in the appended claims

REFERENCE NUMERALS 1 adjusting instrument
2 base shaft
3 housing
3a bottom member housing
3b top member housing
4 housing ring
4a bottom section housing ring
4b top section housing ring
5 drive ring
6 force transmission cam
6a first flank force transmission cam
6b second flank force transmission cam
7 second run-on surface on upper side of top section housing ring
8 upper side of top section housing ring
9 catch surface on upper side of top section housing ring
10a first run-on surface on upper side of bottom section housing ring
10b first run-on surface on underside of top section housing ring
11 stop surfaces
11a stop surface on bottom section housing ring
11b stop surface on top section housing ring
12 underside top section housing ring
13 foot
14 base cam ring
15 housing cam ring 16 circumference of drive ring
17 base cam track
18 stops on base cam track
A longitudinal axis
P arrow
h high drive ring position
l low drive ring position
H high housing position
L low housing position
I drive position/work position
II park position

The invention claimed is:

1. An adjusting instrument for an exterior vision unit for a vehicle, comprising:
   a base shaft;
   a housing surrounding the base shaft that is pivotable around a longitudinal axis of the base shaft in an adjustment range;
   a housing ring that comprises a bottom section that is rotationally coupled to housing and a top section that is configured to cooperate with at least one force transmission cam, wherein the top section is pivotable around the base shaft relative to the bottom section and an underside of the top section is supported by the bottom section;
   a drive ring surrounding the base shaft that includes the at least one force transmission cam, wherein the at least one force transmission cam is configured to:
      upon pivoting of the housing relative to the drive ring in a first pivoting direction around the base shaft, move the housing via the housing ring from a high housing position along the base shaft downwards into a low housing position, and
      upon pivoting of the drive ring relative to the housing in an opposite pivoting direction around the base shaft, move the drive ring along the base shaft upwards from a low drive ring position into a high drive ring position;
   a first run-on surface provided on the top section;
   a first run-on surface provided the bottom section, wherein the first run-on surface of the top section and the first run-on surface of the bottom section are configured to pairwise cooperate to move the drive ring via the force transmission cam axially upwards into the high drive ring position;
   a second run-on surface provided on the top section that cooperates with the force transmission cam to press the housing axially downwards; and
   a respective stop surface provided on each of the top section and the bottom section, wherein the respective stop surface of the top section and the bottom section are configured to through pairwise cooperation limit pivoting of the top section relative to the bottom section in one pivoting direction.

2. The adjusting instrument according to claim 1, wherein upon pivoting of the drive ring the top section of the housing ring is carried along in rotation relative to the bottom section of the housing ring by the at least one force transmission cam of the drive ring.

3. The adjusting instrument according to claim 2, wherein the housing, with the top section of the housing ring being carried along by the at least one force transmission cam of the drive ring, traverses from a first position up to a second position an angle of more than 360 degrees divided by a number of force transmission cams of the drive ring that can cooperate with the housing ring minus at least the angle spanned by an upper side of the first run-on surface of the top section.

4. The adjusting instrument according to claim 1, wherein the first run-on surface of the top section and the second run-on surface are located axially at different positions and/or are located radially at a different distance from the longitudinal axis.

5. The adjusting instrument according to claim 1, wherein the housing and a foot provided on the base shaft are each provided with a respective housing cam ring and a respective base cam ring that form an adjustment range interlock, wherein the adjustment range interlock is configured so that when:
   the housing is in the low housing position, and which upon pivoting of the housing relative to the base shaft from a drive position along the longitudinal axis move axially apart, and upon further pivoting are supported at least partly on each other, namely so that the housing is in the high housing position.

6. The adjusting instrument according to claim 5, wherein furthermore there is provided a spring which surrounds the base shaft and which exerts on the drive ring a spring force along the longitudinal axis in the direction of the foot.

7. The adjusting instrument according to claim 1, furthermore comprising an electric drive unit which is included in the housing, provided with an output element for electrically adjusting the adjusting instrument, the output element cooperating with a circumference of the drive ring.

8. The adjusting instrument according to claim 1, furthermore comprising a base cam track provided on the base shaft.

9. The exterior vision unit for the vehicle, comprising:
   the adjusting instrument according to claim 1, and
   a mirror, display and/or camera coupled with the housing.

10. The adjusting instrument according to claim 1, wherein upon pivoting of the drive ring the top section of the housing ring is carried along in rotation relative to the bottom section of the housing ring by the at least one force transmission cam of the drive ring.

11. The adjusting instrument according to claim 10, wherein the housing, with the top section of the housing ring being carried along by the at least one force transmission cam of the drive ring, traverses from a first position up to a second position an angle of more than 360 degrees divided by a number of force transmission cams of the drive ring that can cooperate with the housing ring minus at least the angle spanned by an upper side of the first run-on surface of the top section.

* * * * *